(12) United States Patent
Mulder et al.

(10) Patent No.: US 9,061,834 B2
(45) Date of Patent: Jun. 23, 2015

(54) MANIPULATIVE AUGER SYSTEM

(71) Applicant: Dethmers Manufacturing Company, Boyden, IA (US)

(72) Inventors: Ryan Mulder, Sheldon, IA (US); Robert Koerselman, Boyden, IA (US)

(73) Assignee: Dethmers Manufacturing Company, Boyden, IA (US)

( * ) Notice: Subject to any disclaimer, the term of this patent is extended or adjusted under 35 U.S.C. 154(b) by 58 days.

(21) Appl. No.: 13/632,688

(22) Filed: Oct. 1, 2012

(65) Prior Publication Data

US 2014/0090958 A1 Apr. 3, 2014

(51) Int. Cl.
| | |
|---|---|
| *B65G 33/08* | (2006.01) |
| *B65G 33/32* | (2006.01) |
| *B60P 1/42* | (2006.01) |
| *A01F 12/46* | (2006.01) |
| *A01D 41/12* | (2006.01) |

(52) U.S. Cl.
CPC .............. *B65G 33/08* (2013.01); *B65G 33/32* (2013.01); *B60P 1/42* (2013.01); *A01F 12/46* (2013.01); *A01D 41/1217* (2013.01)

(58) Field of Classification Search
CPC ........ B65G 33/12; B65G 33/20; B65G 33/08; A01F 12/46
USPC .................................. 198/666, 668; 414/523
See application file for complete search history.

(56) References Cited

U.S. PATENT DOCUMENTS

| | | | |
|---|---|---|---|
| 4,078,685 A | 3/1978 | Corbin et al. | |
| 4,104,850 A | 8/1978 | Harris | |
| 4,144,655 A | 3/1979 | Harris | |
| 4,443,149 A | 4/1984 | Isaacson | |
| 4,662,812 A * | 5/1987 | Busboom et al. | 414/523 |
| 4,923,358 A | 5/1990 | Van Mill | |
| 5,129,164 A | 7/1992 | Painter et al. | |
| 5,253,746 A | 10/1993 | Friesen et al. | |
| 5,351,805 A * | 10/1994 | Miller et al. | 198/493 |
| 5,409,344 A | 4/1995 | Tharaldson | |
| 5,538,388 A | 7/1996 | Bergkamp et al. | |
| 5,575,316 A | 11/1996 | Pollklas | |
| 5,800,116 A | 9/1998 | Smith et al. | |
| 5,888,044 A * | 3/1999 | Baskerville | 414/523 |
| 5,980,189 A | 11/1999 | Rubner | |
| 6,042,326 A * | 3/2000 | Thomas et al. | 414/502 |
| 6,497,546 B2 * | 12/2002 | Wood et al. | 414/523 |
| 6,508,705 B1 | 1/2003 | Van Overschelde | |
| 6,767,174 B2 * | 7/2004 | Cresswell | 414/523 |
| 6,908,380 B2 * | 6/2005 | Silver | 460/114 |

(Continued)

*Primary Examiner* — Gene Crawford
*Assistant Examiner* — Thomas Randazzo
(74) *Attorney, Agent, or Firm* — Brick Gentry PC; Brian J. Laurenzo; Jessica L. Susie

(57) ABSTRACT

An auger assembly for moving material is disclosed. The auger assembly includes a first auger section, second auger section, and joint connecting the two sections. The second auger section includes an auger assembly output for dispensing material, such as a harvested grain. The first auger section, second auger section, and joint each rotate about its own axis, thereby causing three-dimensional movement of the auger assembly and particularly the auger assembly output. The auger assembly is capable of both manual control, such as by a joystick, and automatic control, such as by an electronic controller. Also provided is a material handling apparatus employing the disclosed auger assembly and also including a container for storing material to be moved by the auger assembly.

24 Claims, 10 Drawing Sheets

(56) References Cited

U.S. PATENT DOCUMENTS

| | | |
|---|---|---|
| 7,093,707 B2 * | 8/2006 | Matousek et al. ............ 198/668 |
| 7,267,519 B2 * | 9/2007 | Cresswell et al. ............ 414/526 |
| 7,428,956 B2 * | 9/2008 | Scherman ..................... 198/312 |
| 7,862,286 B2 * | 1/2011 | Mackin et al. ................ 414/519 |
| 8,381,900 B1 * | 2/2013 | Hoogestraat ................... 198/588 |
| 8,585,343 B2 * | 11/2013 | Wood ............................ 414/523 |
| 8,627,947 B2 * | 1/2014 | Houssian ....................... 198/668 |
| 2006/0078412 A1 * | 4/2006 | Hagemann .................... 414/467 |
| 2013/0096782 A1 * | 4/2013 | Good et al. .................... 701/50 |

* cited by examiner

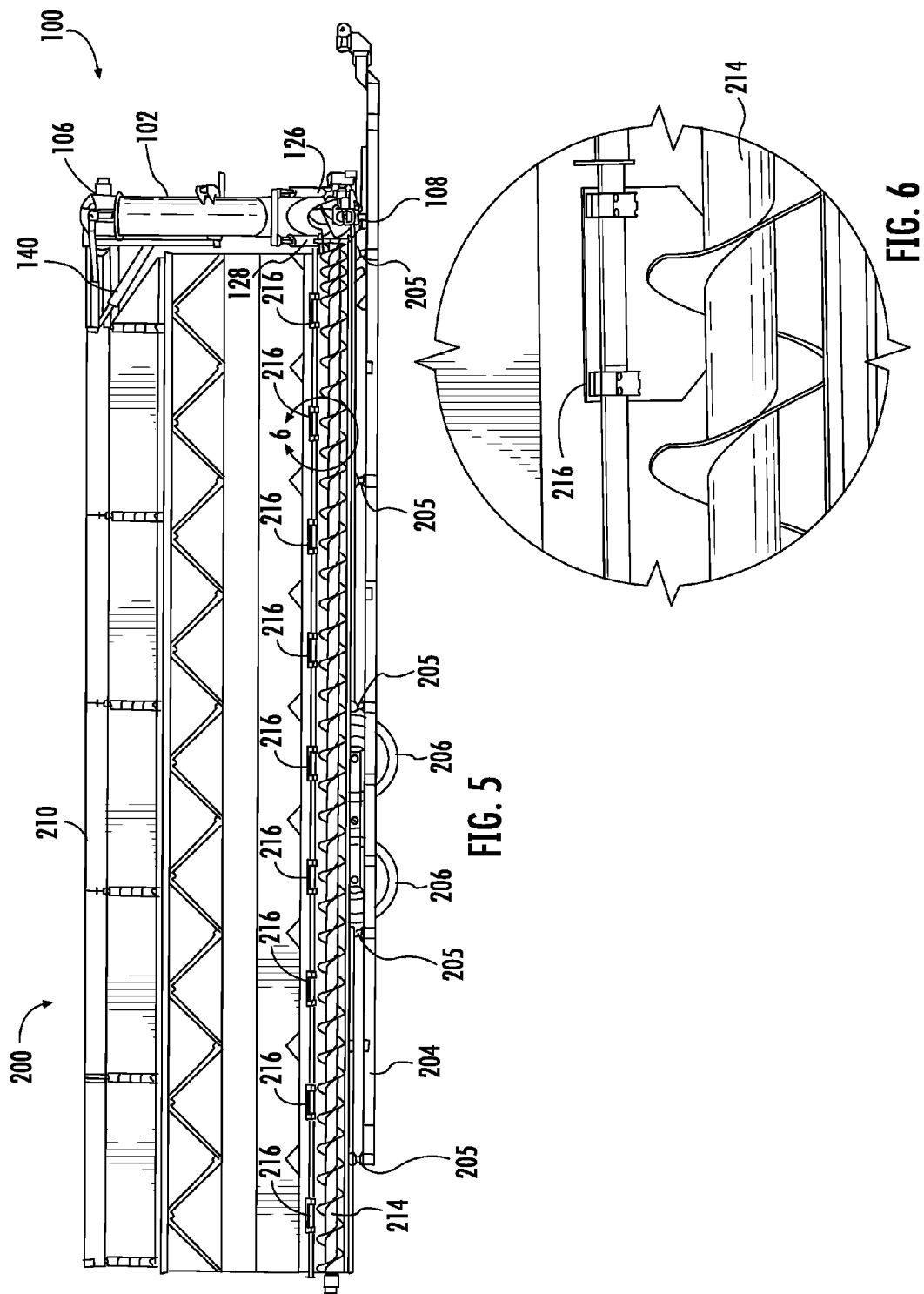

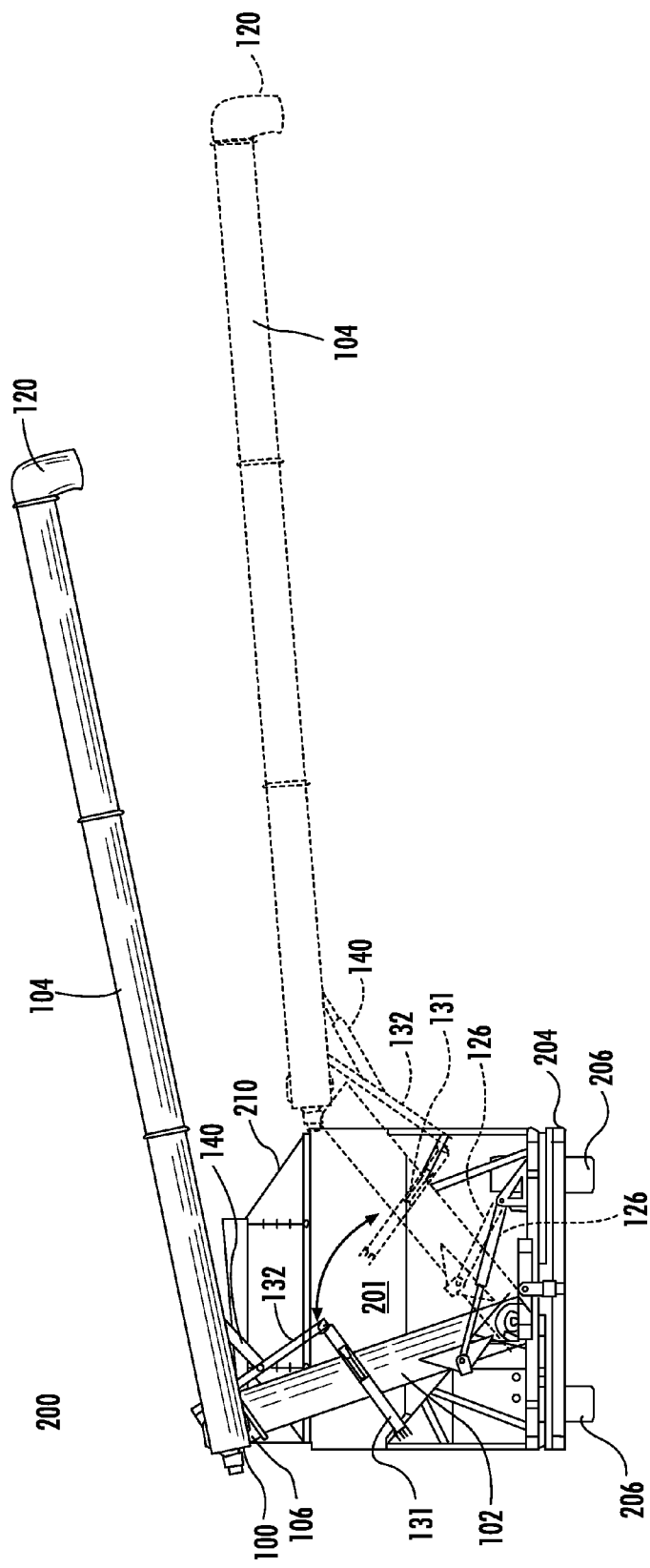

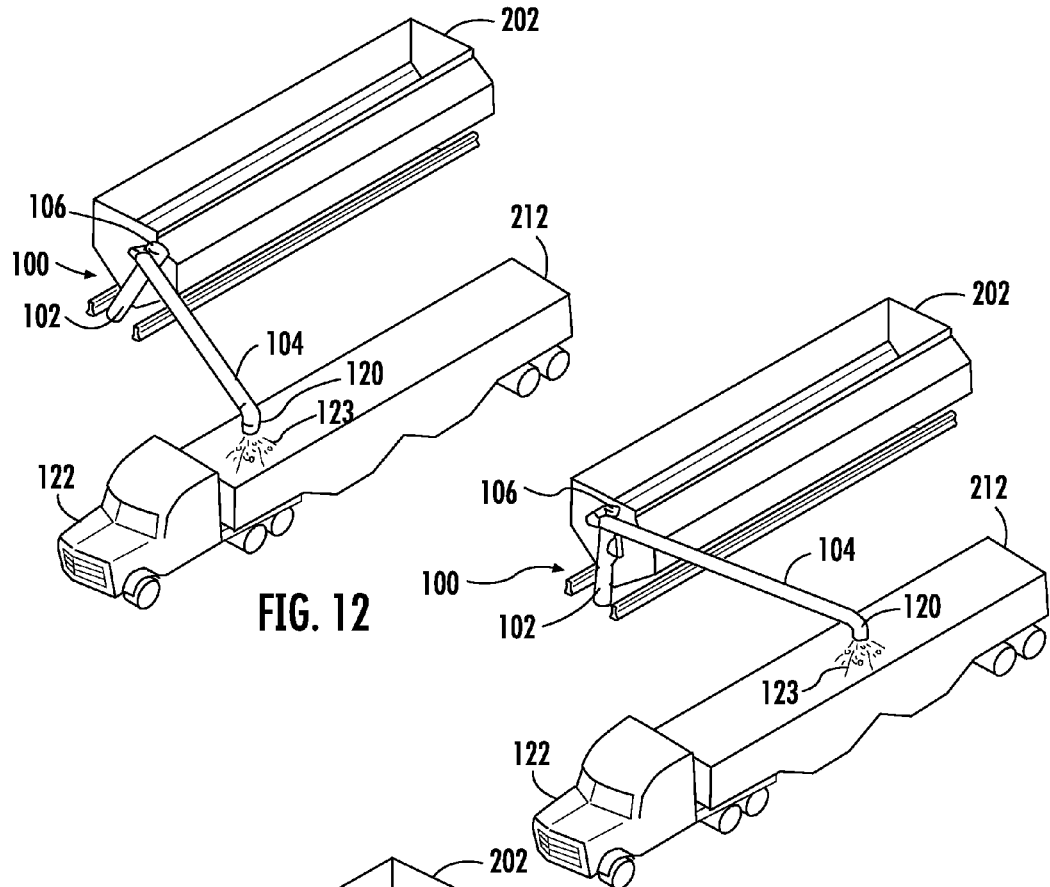
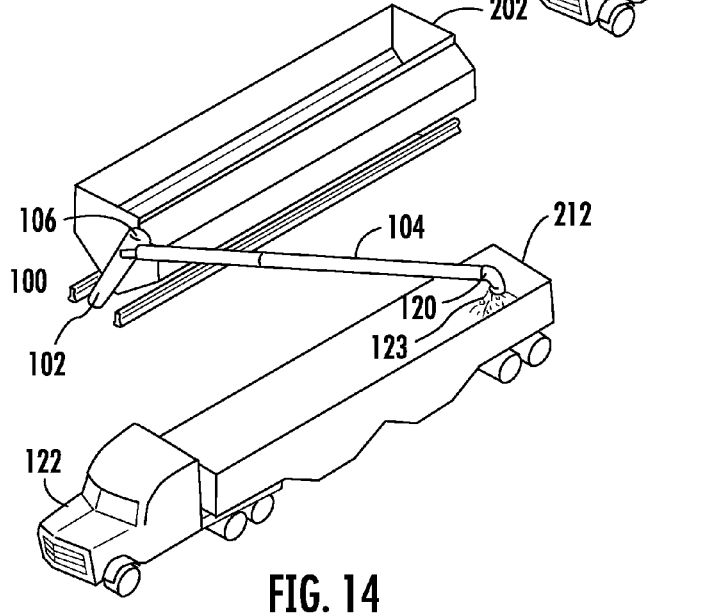
FIG. 12
FIG. 13
FIG. 14

MANIPULATIVE AUGER SYSTEM

FIELD OF THE INVENTION

The present invention relates generally to augers used in the handling of material. More specifically, the present invention relates to the accurate loading of any material, such as a harvested product including but not limited to harvested grain into a vehicle, such as a truck or wagon, without the need for either piece of equipment to be moved. To that end, the present invention relates to an auger, the output end of which is capable of three-directional movement. The auger of the present invention is capable of both manual and electronic control. The invention further relates to a surge bin employing said auger.

BACKGROUND

Harvest is generally a very busy time of year for those in the agriculture industry. Time and efficiency are important factors for a successful harvest. The task requires use of many resources, including equipment and personnel. For example, a typical grain harvest operation includes at least one combine to remove a crop from a field, but more often includes approximately three combines per field. Usually, each combine dispenses harvested product into a grain wagon, which a tractor pulls alongside the combine. Generally, the grain cart includes a means for removing the grain from the cart and depositing it into an apparatus that will transport the grain to a permanent or semi-permanent destination, such as a grain elevator, biofuel plant, or grain bin. Such apparatuses include, but are not limited to, grain wagons and semi-trucks.

Most farms are measured in sections of land, with a section being approximately one square mile, and one quarter section being a common farm size. One quarter section is approximately 160 acres. Most agricultural operations require three combines to harvest a quarter section of grain. Accordingly, the harvest task requires three combine operators as well as three tractor operators to pull grain wagons alongside the combines. Moreover, operators are required for the trucks and grain wagons used to transport the harvested grain to a destination. Hence, harvest is a labor and personnel intensive activity that must be completed in a short time.

One semi-permanent destination for a harvested product, such as a harvested grain product, is a surge bin. A surge bin is a large, yet portable, grain storage apparatus for use during harvest. The surge bin is placed in a field to be harvested. Once the combines fill their respective grain carts, the grain carts unload into the surge bin via means such as an auger or belt conveyer. The surge bin holds the grain until a transport apparatus, such as a truck or grain wagon, is available to move the product to a destination located outside of the field. At such time as a transport apparatus becomes available, the harvested product is moved to same. In addition, surge bins are useful for co-ops and elevators to store product. One means for moving harvested material from the surge bin is by an auger.

Traditionally, augers are stationary devices, although some agricultural augers have the ability to pivot in a limited manner. Some agricultural augers pivot about a hinge, such as a piano hinge, to permit folding of an upper portion of the auger when not in use. However, when folded, these augers no longer permit material to be moved. Accordingly, in order to evenly distribute grain in a truck or wagon, one of the apparatuses must be moved. For example, when a grain cart is unloading into the trailer of a semi-truck, one or both of the grain cart and semi-truck must be moved to evenly distribute grain in the semi-truck. In another example, when moving grain from a stationary surge bin to the trailer of a semi-truck, the semi-truck must be moved during the loading process. This activity requires two operators, an operator for the surge bin auger and an operator to run the semi-truck.

An auger with limited pivotal movement is described in U.S. Pat. No. 5,409,344, which provides an auger device having an upper and lower auger. The lower auger is fixed to a grain cart, while the upper auger is capable of pivoting around a single axis. Although this provides for some movement of the auger, the auger described in U.S. Pat. No. 5,409,344 is only capable of movement in a circular arc. Accordingly, the prior art auger is unable to fill a transport apparatus, such as a semi-truck, from the same horizontal plane above the truck. Another auger with limited pivotal movement is described in U.S. Pat. No. 5,800,116, which provides an auger having a single auger length. The single auger length is capable of pivotal movement in two planes, allowing for front-to-back movement and up-and-down movement of the auger with respect to the grain cart to which it is attached. However, because of the limited, two-directional movement of the auger, the problems associated with the circular path discussed above are still present. Additionally, some augers of the prior art employ adjustable spouts or outputs to dispense material in a particular direction. However, these augers are not capable of a full range of movement, thus requiring movement or precise parking of an apparatus to be filled.

Accordingly, there is a need in the art for an auger assembly that is capable of a full range of three-directional motion, including, but not limited to, front-to-back, up-and-down, and in-and-out motions with respect to a material handling device to which it is attached. There is further a need in the art for a surge bin employing such an auger, which would eliminate the need for a second operator to facilitate the transfer of grain from the surge bin to a semi-truck or wagon. Such an auger would further have the ability to fill the long trailer of a semi-truck while moving along a straight path above the trailer, which allows for increased accuracy during the process. Furthermore, such an auger would have the ability to occupy any point in space above the trailer during filling without movement of the bin to which the auger is attached or the semi-truck.

SUMMARY

The present invention provides a manipulative auger system wherein the auger assembly is capable of three-directional movement, thus allowing a user to move the auger over the top of a semi-truck trailer in a straight line so as to evenly fill the trailer. Also included in the present invention is a material handling apparatus, including but not limited to a grain cart or surge bin, employing said auger assembly. The provided auger assembly includes a first auger section and a second auger section connected by a joint. The first auger section moves harvested product from the material handling apparatus to the second auger section by way of a transition through the joint. The second auger section moves the harvested product from the first auger section to an auger assembly output, which dispenses product into a transport apparatus. The present invention provides an auger that may move across the length of a transport apparatus, such as the trailer of a semi-truck or a grain wagon. Therefore, both the material handling apparatus to which the auger is attached and the transport apparatus into which the auger is unloading may remain stationary. This eliminates the need for a second operator, as the driver of the semi-truck or tractor pulling the grain wagon may park his apparatus, disembark from same, and operate the auger.

In the preferred embodiment, the first auger section is movably connected to the wall of a material handling apparatus that is closest to the tractor pulling same. Preferably, material flows through at least one auger door located in the material handling apparatus that regulates the flow of product. The first auger section is further connected to a joint, which connects the first auger section and second auger section. The joint is movably connected to the first auger section. The second auger section is movably connected to the joint. Accordingly, the auger assembly includes three points at which movement may occur, allowing for three-directional movement of the auger assembly output. The auger assembly output is located at the opposite end of the second auger section from the joint. Product is discharged through the auger assembly output.

In the preferred embodiment, the auger assembly includes an electronic controller which is adapted to control movement of the auger and/or the auger door(s). Further, in the preferred embodiment, the auger assembly is also capable of manual control, such as via a joystick. The electronic controller takes the form of a console that includes a screen and control buttons. The controller may be located in the cab of the tractor pulling the material handling apparatus to which the auger is attached or may be located on the material handling apparatus, such as a surge bin or grain cart. In the preferred embodiment, the controller is located in the cab of the tractor. Furthermore, the tractor provides power for the hydraulic, power take-off, and electronics of the auger assembly components. Alternatively, the power for the above-referenced systems could come from another source, such as a source self-contained on the surge bin. In the preferred embodiment, the controller is adapted to automatically start and/or stop an unloading process.

Also provided is a material handling apparatus including a storage container for storing material, an auger door, and an auger assembly. The material handling apparatus, which may include but is not limited to a surge bin or grain cart, generally stores material temporarily during the harvest process. Accordingly, the device must be able to quickly and accurately unload product into another handling device. To that end, the output of the auger assembly is capable of three-directional movement. Further, the auger may be electronically and/or manually controlled.

BRIEF DESCRIPTION OF THE DRAWINGS

FIG. 5 is a cross-sectional view of the material handling apparatus of FIG. 1 taken along the lines 5-5 in FIG. 1.

FIG. 6 is a side elevational view of an auger door of the material handling apparatus of FIG. 4.

FIG. 7 is a front elevational view of the auger assembly and material handling apparatus of FIG. 1 displaying movement of the auger assembly in a first direction.

FIG. 12 is a perspective view of the auger assembly and material handling apparatus of FIG. 1. dispensing material from a first position into a semi-trailer.

FIG. 13 is a perspective view of the auger assembly and material handling apparatus of FIG. 1. dispensing material from a second position into a semi-trailer.

FIG. 14 is a perspective view of the auger assembly and material handling apparatus of FIG. 1. dispensing material from a third position into a semi-trailer.

DETAILED DESCRIPTION

The following is a detailed description of an embodiment of an auger assembly 100 for moving material. One particular use of such an auger assembly 100 is for the movement of a harvested crop, such as during the harvest operation itself. Also included in the present invention is a material handling apparatus 200 employing the auger assembly 100 of the present invention. For ease of discussion and understanding, the following detailed description and illustrations often refer to the auger assembly 100 for use with a material handling apparatus 200 that is a surge bin. It should be appreciated that the auger assembly 100 of the present invention may be used with any equipment, whether directed to a harvest function or otherwise. Further, it should be appreciated that the material handling apparatus 200 may be any agricultural equipment that handles a harvested crop, whether during the actual harvest operation or at a point in time thereafter. Oftentimes, the detailed description will refer to a material that is a grain. However, it should be appreciated that the present invention is for use with any material.

Figure 1:
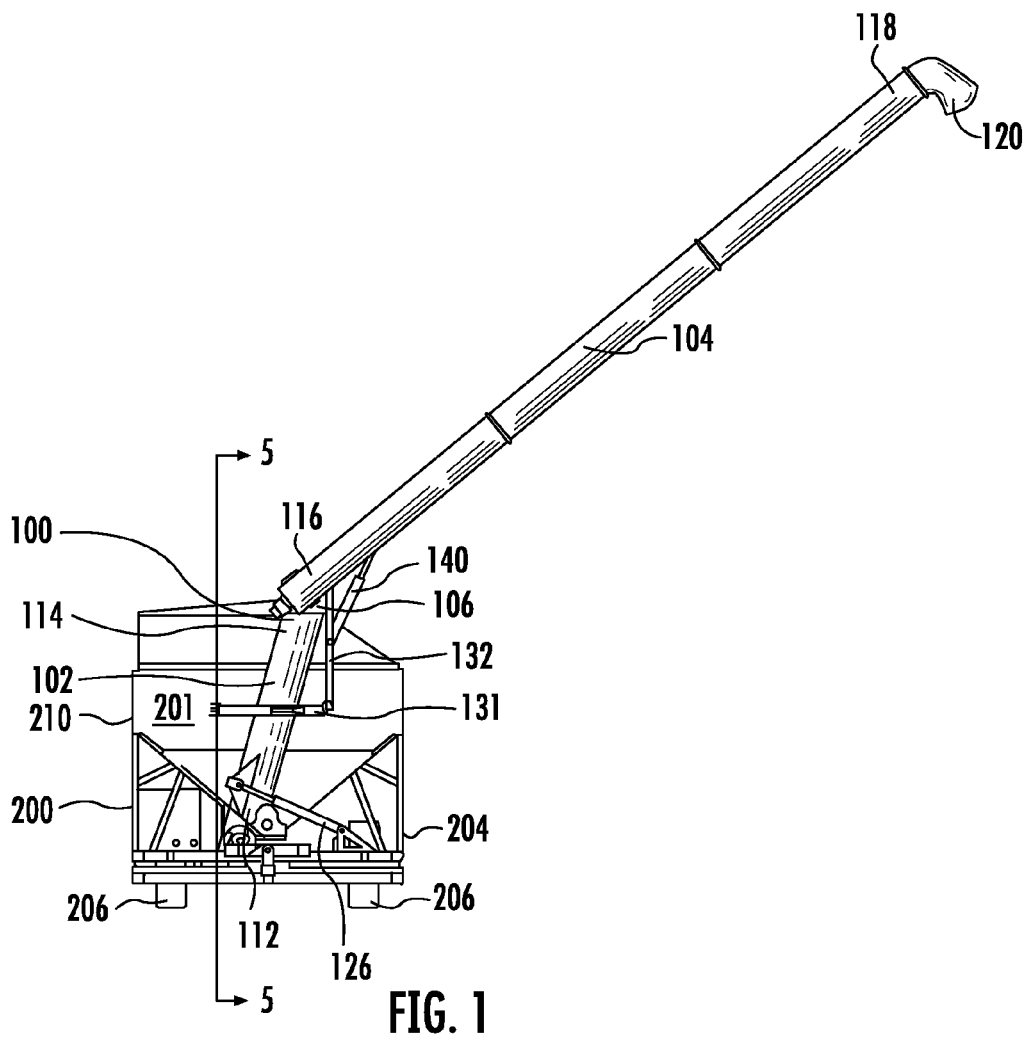
FIG. 1 is a front elevational view according to one embodiment of an auger assembly and material handling apparatus of the present invention.
Figure 2:
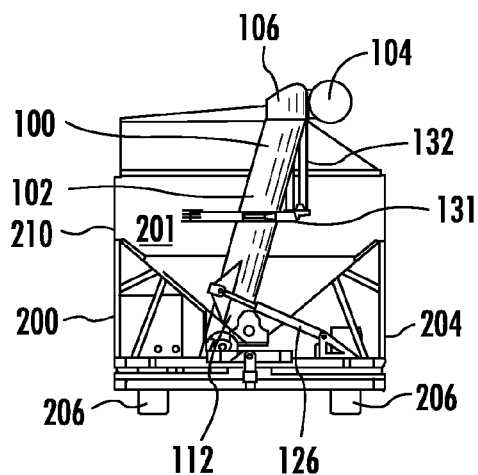
FIG. 2 is a front elevational view of the auger assembly and material handling apparatus of FIG. 1 wherein the auger assembly is in its non-operational or resting position.

Referring to FIG. 1, an auger assembly 100 (sometimes "assembly") and material handling apparatus 200 (sometimes "apparatus") are shown. The assembly 100 includes a first auger section 102 and a second auger section 104. The assembly 100 further includes a joint 106 located between and connecting the first auger section 102 and second auger section 104, which is shown in further detail in FIGS. 3 and 4. The first auger section 102 is connected at its proximal end 112 to a material handling apparatus 200 at an auger assembly intake 108 (shown in FIG. 3). In the illustrated embodiment, the material handling apparatus is a surge bin. As is known in the art, a surge bin for agricultural use is a large, yet transportable storage bin. During a harvest operation, the surge bin may be pulled by a tractor from field to field to temporarily store harvested product. Further advantages of a surge bin of the present invention will be discussed in further detail below. FIG. 1 illustrates the auger assembly 100 of the present invention in an operational mode. As seen in FIG. 2, the auger assembly 100 may also be folded into a non-operational or resting position when not in use. Generally the auger assembly 100 of the present invention is designed to dispense grain on the right side of a material handling apparatus 200; however, one of skill in the art will recognize that the auger assembly 100 of the present invention may be adapted to dispense material in any direction.

Figure 3:
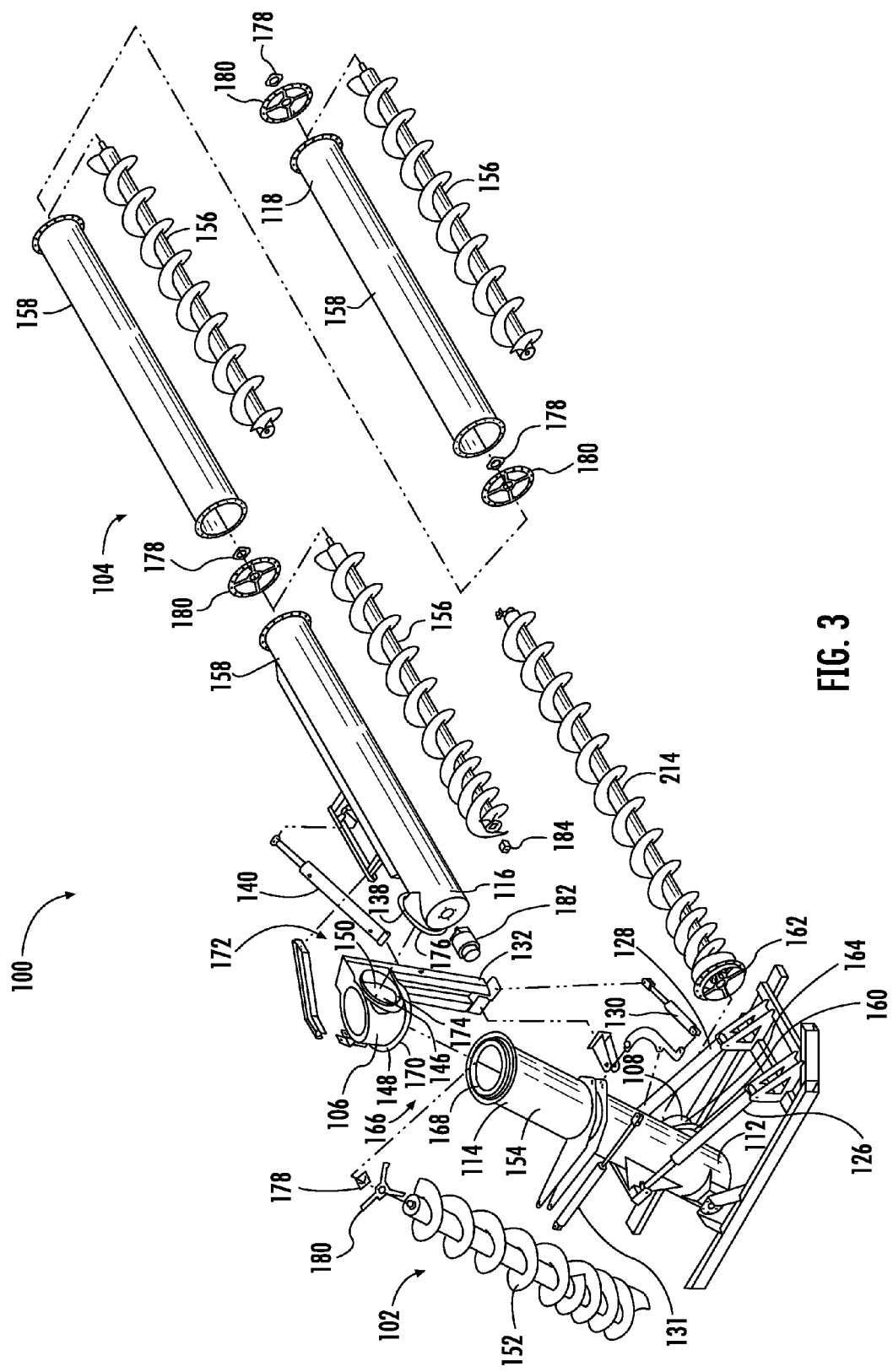
FIG. 3 is an exploded view of the auger assembly of FIG. 1.
Figure 4:
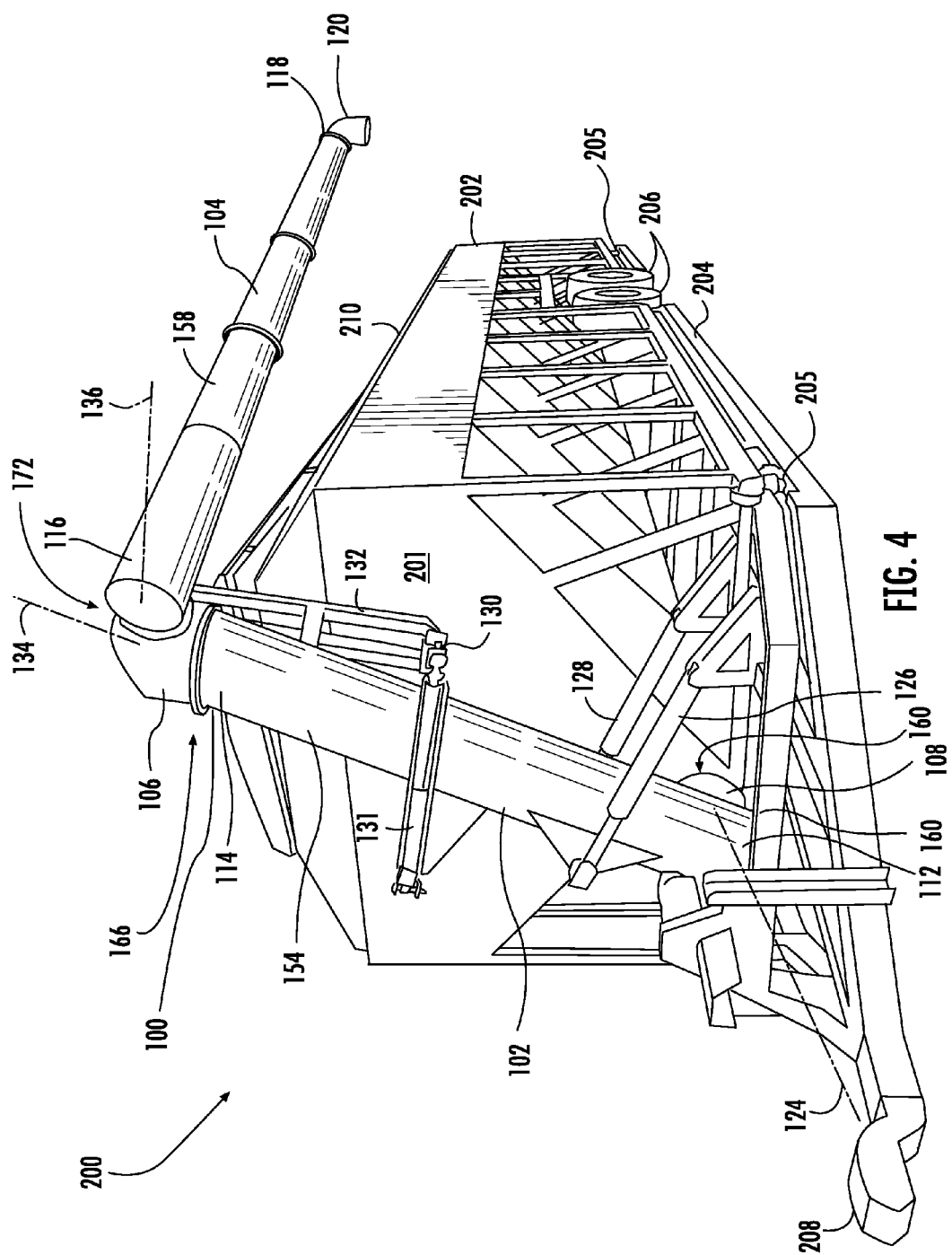
FIG. 4 is a perspective view of the auger assembly and material handling apparatus of FIG. 1.

As shown in the exploded view of FIG. 3, the first auger section 102 includes a flighting 152 enclosed in a tubular housing 154. Accordingly, the first auger section 102 is configured to move material upwardly out of the apparatus 200. As discussed above, the first auger section 102 is connected to the apparatus 200 at its proximal end 112. The first auger section 102 is connected to the joint 106 at its distal end 114. Also attached to the joint 106 is the second auger section 104. The second auger section 104 includes a proximal end 116 connected to the joint 106, and a distal end 118. Similar to the first auger section 102, the second auger section includes a flighting 156 and tubular housing 158. Accordingly, the second auger section 104 is also adapted to move material. As shown in FIG. 3, the second auger section 104, is preferably assembled from three portions of flighting 156 and tubular housing 158. Furthermore, the second auger section 104 includes a hydraulic motor 182 and corresponding drive block 184 to drive the flighting 156 of the second auger section 104. Referring to FIG. 4, at the distal end 118 is an auger assembly output 120. The auger assembly output 120 is adapted to dispense grain into a second device, such as a transport apparatus 122. The transport apparatus 122 could be, but is not limited to, a grain wagon or the trailer of a semi-truck adapted to transport grain. Generally the auger assembly output 120 is angled downward to form a spout to direct the flow of material into the transport apparatus 122. Further shown in FIG. 3 are bearings 178 and support plates 180 where the portions of auger flighting meet.

Referring again to FIG. 4, a perspective view of the assembly 100 and apparatus 200 of the present invention is shown. Specifically, in the embodiment shown, the assembly 100 is attached to an apparatus 200 that is a surge bin 202. The surge bin 202 generally includes a frame 204, wheels 206, and a hitch 208 configured to be attached to a tractor. The surge bin 202 further includes a container 210 for holding material, generally a harvested product. The surge bin 202 is transportable from location to location. It should be appreciated that the assembly 100 need not be attached to a surge bin 202 and further need not be attached to a transportable device. For example, the assembly 100 may be adapted for use with a grain cart or grain bin. The assembly 100 and apparatus 200 are connected at the auger assembly intake 108. The auger assembly intake 108 is generally tubular in shape and facilitates the movement of product from the surge bin 202 to the first auger section 102. The auger assembly intake 108 is connected to a complimentary shaped opening in the container 210 by any attachment means known in the art, such as nuts and bolts. The auger assembly intake 108 receives material from a material handling apparatus auger 214.

Referring to FIGS. 5 and 6, material travels from the container 210 to the first auger section 102 via the material handling apparatus auger 214 located at the bottom of the container 210. FIG. 5 is a cross-sectional view of a material handling apparatus of the present invention showing the material handling apparatus auger 214 and material handling apparatus auger doors 216. FIG. 6 is a larger view of a material handling apparatus auger door 216 of the present invention. In the preferred embodiment, the material handling apparatus auger 214 spans the length of the material handling apparatus 200 and is located beneath nine material handling apparatus auger doors 216 that can be activated to open and close as necessary to control the flow of material from the container 210 to the auger assembly 100. When the doors are open, material may drop from the container 210 to the material handling apparatus auger 214, which includes a flighting that is not enclosed by a tube. Accordingly, the material handling apparatus auger grabs the material and pushes it forward to the auger assembly 100. When determining the position of the material handling apparatus 200 in a field, the ground should be fairly level, but need not be completely level. The weight of the apparatus 200 will cause it to sink into the ground slightly, allowing the apparatus 200 to level itself.

Turning to FIG. 4, the first auger section 102 pivots about an axis 124 that extends longitudinally through the center of the auger assembly intake 108. Axis 124 is fixed in relation to the container 210 and lower auger section 102. The range of movement about axis 124 may be any value. However, when determining the range of movement of the auger assembly 100, it should be remembered that the entire auger assembly 100 must be able to safely clear all parts of the material handling apparatus 200 and any transport apparatuses 122 into which the auger assembly 100 will unload. This motion is further depicted in FIG. 7. It should be appreciated that any range of motion may be used as the application so requires. Further, in the preferred embodiment, the movement of the first auger section 102 is carried out by a pair of hydraulic cylinders 126, 128. One of skill in the art will recognize that any means may be used to facilitate movement of the first auger section 102 whether known now or in the future.

Referring to FIGS. 3 and 4, in the preferred embodiment, the first auger section 102 is connected to the material handling apparatus 200 by means of a first turret joint 160. The turret joint includes a small diameter cylinder 162 located within a large diameter cylinder 164, which is just large enough to fit over the small diameter cylinder 162 and allow rotation. The large diameter cylinder 164 is connected to the first auger section 102. As the hydraulic cylinders 126, 128 cause the first auger section 102 to pivot, the large diameter cylinder 164 rotates with the lower auger section 102. The small diameter cylinder 162 of the auger assembly intake 108 remains stationary. Material, such as grain in the illustrated embodiment, moves freely through the small diameter cylinder 162 into the first auger section 102. As one skilled in the art will recognize, the configuration of the first turret joint 160, particularly the placement and attachment of the small diameter cylinder 162 and large diameter cylinder 164 may be reversed. Moreover, the length of the small diameter cylinder 162 within the large diameter cylinder 164 may vary as the application so requires.

Figure 9:
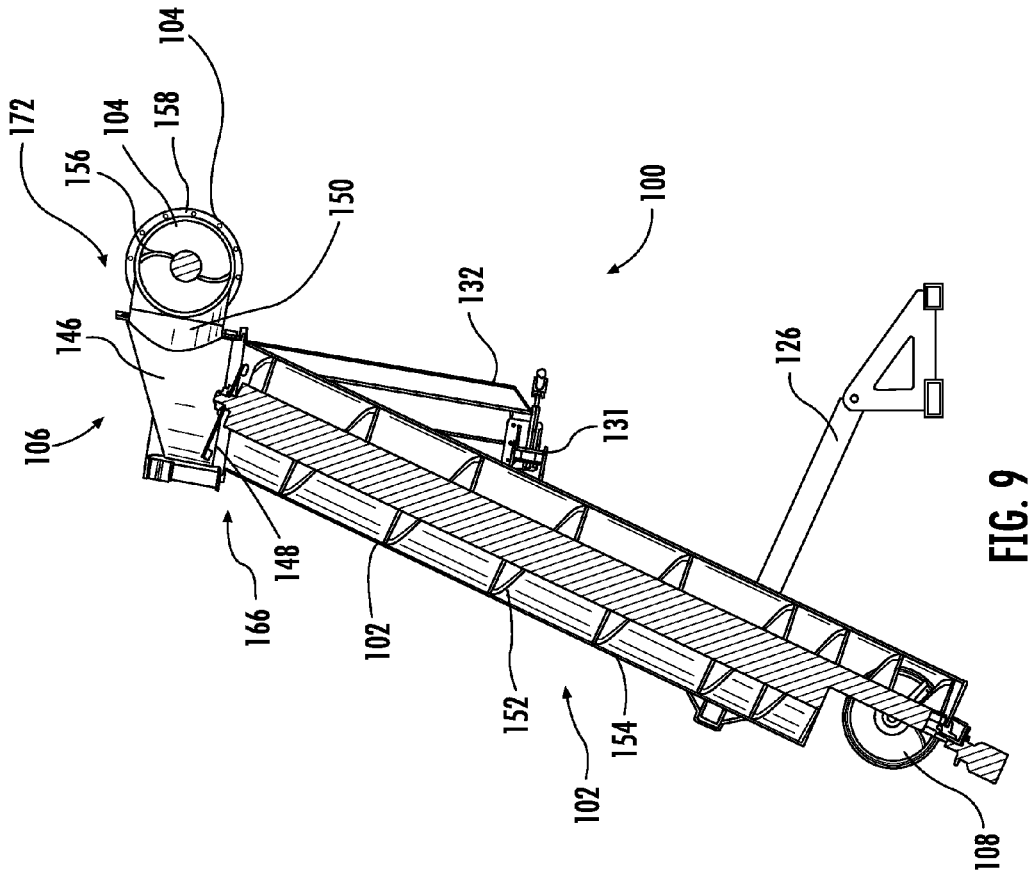
FIG. 9 is a cross-sectional view of the first auger section, joint, and a portion of the second auger section taken along the lines 9-9 in FIG. 8.
Figure 8:
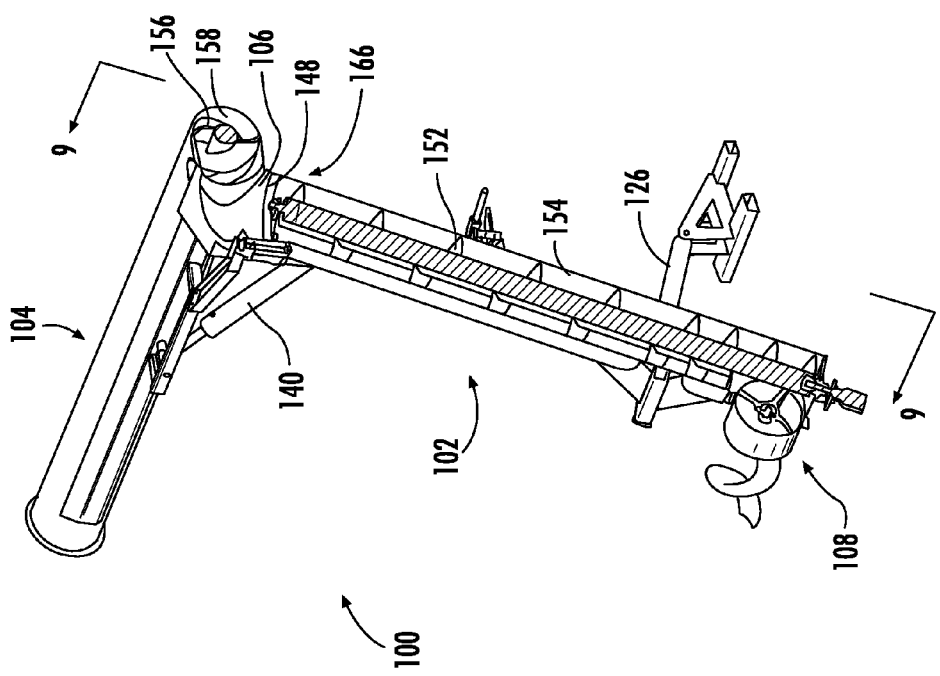
FIG. 8 is a perspective view of the first auger section, joint, and a portion of the second auger section of the auger assembly of FIG. 1.

As shown in FIGS. 3 and 4, a joint 106 connects the first auger section 102 and second auger section 104. The joint 106 is shown in further detail in FIGS. 8 and 9. As can be seen in FIG. 9, the cross-sectional shape of the joint 106 is a quadrilateral. The joint 106 is connected to the first auger section 102 at its bottom 148 and to the second auger section 104 on a side 150. As shown in FIG. 3, the joint 106 connects with the first auger section 102 via a circular opening that is complimentary to the tubular housing of the first auger section 102. The joint 106 connects to the second auger section 104 via a circular opening 138 in the side of the second auger section 104 near the proximal end 116 of the second auger section 104. The joint 106 includes an internal transition area 146 where the material flows from the first auger section 102 to the second auger section 104. In the preferred embodiment, the transition area 146 does not include a flighting, rather the action of the first auger section 102 forces material through the transition area 146 by continuing to push material through the assembly 100.

Referring to FIG. 4, the joint 106 rotates, about an axis 134 that extends through the center of the length of the first auger section 102. As one skilled in the art will recognize, as the first auger section 102 is moved about axis 124, axis 134 also pivots about axis 124, thus contributing to the three-directional movement of the auger assembly output 120. Accordingly, the axis 134 about which the joint 106 rotates is not necessarily fixed in space. This movement is further depicted in FIG. 10. The range of motion about axis 134 may be any value, but will often be limited to avoid hitting other components of the apparatus 200 or other equipment used in proximity to the apparatus 200, such as a transport apparatus 122. However, one of skill in the art will recognize that any range of motion may be used as the application so requires.

In the preferred embodiment, the movement of the joint 106 is carried out by a single hydraulic cylinder 131, which is connected to a brace 132. The brace 132 supports the weight of the second auger section 104. It should be appreciated that any means may be used to facilitate movement of the joint 106 whether known now or in the future. Referring to FIG. 3, a second turret joint 166 provides for the rotational movement of the joint 106 about axis 134. The turret joint includes a small diameter cylinder 168 and a large diameter cylinder 170. The large diameter cylinder 170 spins around the small diameter cylinder 168 when activated by the hydraulic cylinder 131. The second auger section 104 is attached to the large diameter, outer cylinder of the joint 106. Accordingly, as the joint 106 rotates, the second auger section 104 rotates with the joint 106. As one skilled in the art will recognize, the configuration of the second turret joint 166, particularly the placement and attachment of the small diameter cylinder 168 and large diameter cylinder 170 may be reversed. Moreover, the length of the small diameter cylinder 168 within the large diameter cylinder 170 may vary as the application so requires.

Referring again to FIG. 4, the second auger section 104 further includes the auger assembly output 120. As can be seen in FIG. 3, the second auger section 104 is preferably made of three auger portions that have been connected to form one continuous second auger section 104. The second auger section 104 pivots about an axis 136 that extends through the center of the circular opening 138 through which material travels from the joint 106 to the second auger section 104. As the first section pivots about axis 124 and the joint rotates about axis 134, axis 136 will move as well, thus creating the three directional movement of the auger assembly 100. Accordingly, axis 136 is not necessarily fixed in space. The movement is further depicted in FIG. 11. The range of motion about axis 136 may be any value, although in most embodiments, the range of motion need not be greater than 90 degrees. One of skill in the art will recognize that the range of motion will depend on the application.

Referring to FIG. 3, in the preferred embodiment, the movement of the second auger section 104 is facilitated by a hydraulic cylinder 140, which is connected to the brace 132. One of skill in the art will recognize that any means may be used to effect movement of the second auger section 104 about axis 136. Further, in the preferred embodiment the second auger section 104 is connected to the joint 106 though a third turret joint 172. The third turret joint 172 also includes a small diameter cylinder 174 within a large diameter cylinder 176. The large diameter cylinder 176 is connected to the second auger section 104 and rotates around the small diameter cylinder 174. As one skilled in the art will recognize, the configuration of the third turret joint 172, particularly the placement and attachment of the small diameter cylinder 174 and large diameter cylinder 176 may be reversed. Moreover, the length of the small diameter cylinder 174 within the large diameter cylinder 176 may vary as the application so requires. As shown in FIG. 2, the second auger section 104 may be folded into a storage position. Referring to FIG. 3, hydraulic cylinder 130 rotates the joint 106 and second auger section 104 into the storage position.

Figure 10:
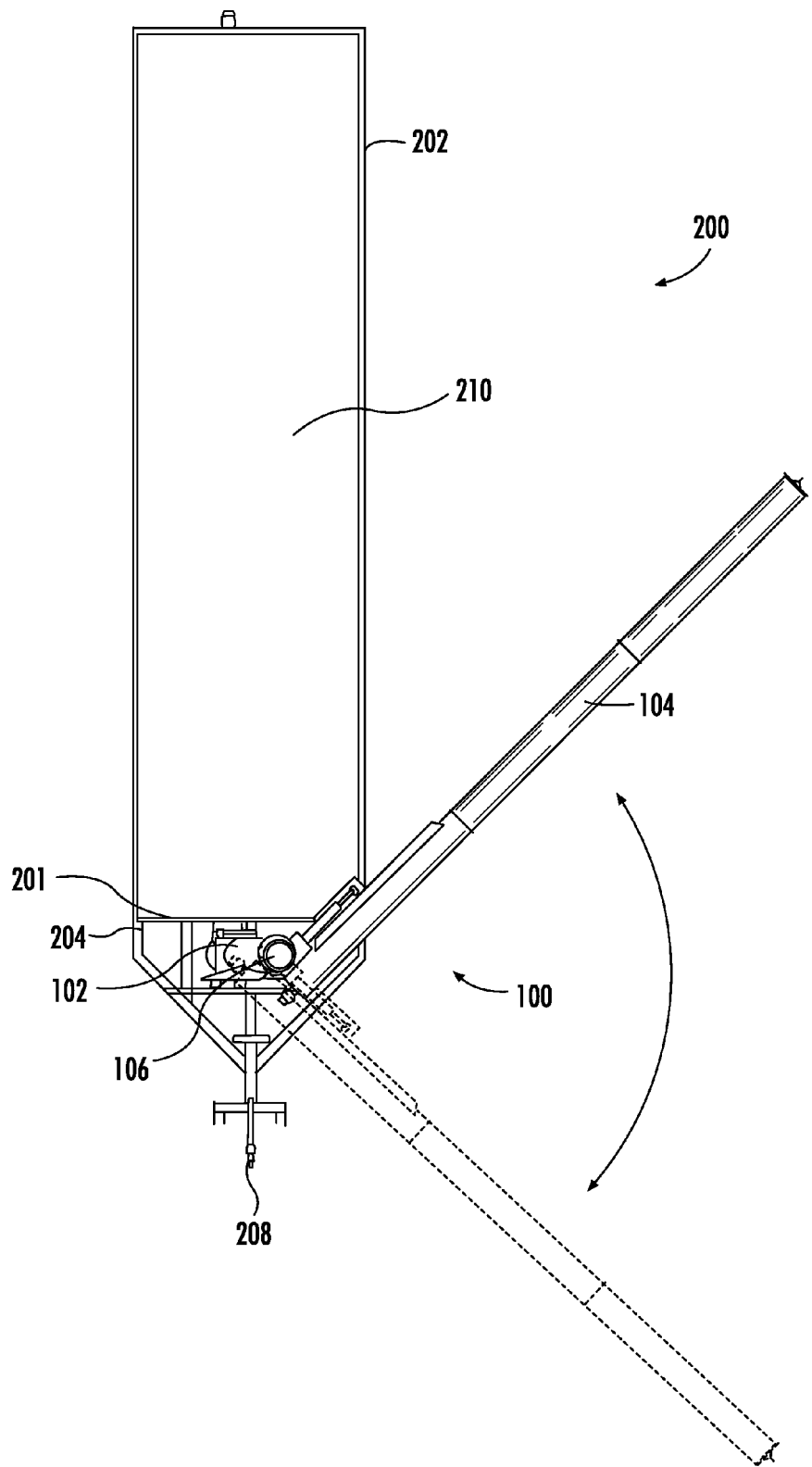
FIG. 10 is a top plan view of the auger assembly and material handling apparatus of FIG. 1, displaying movement of the auger assembly in a second direction.
Figure 11:
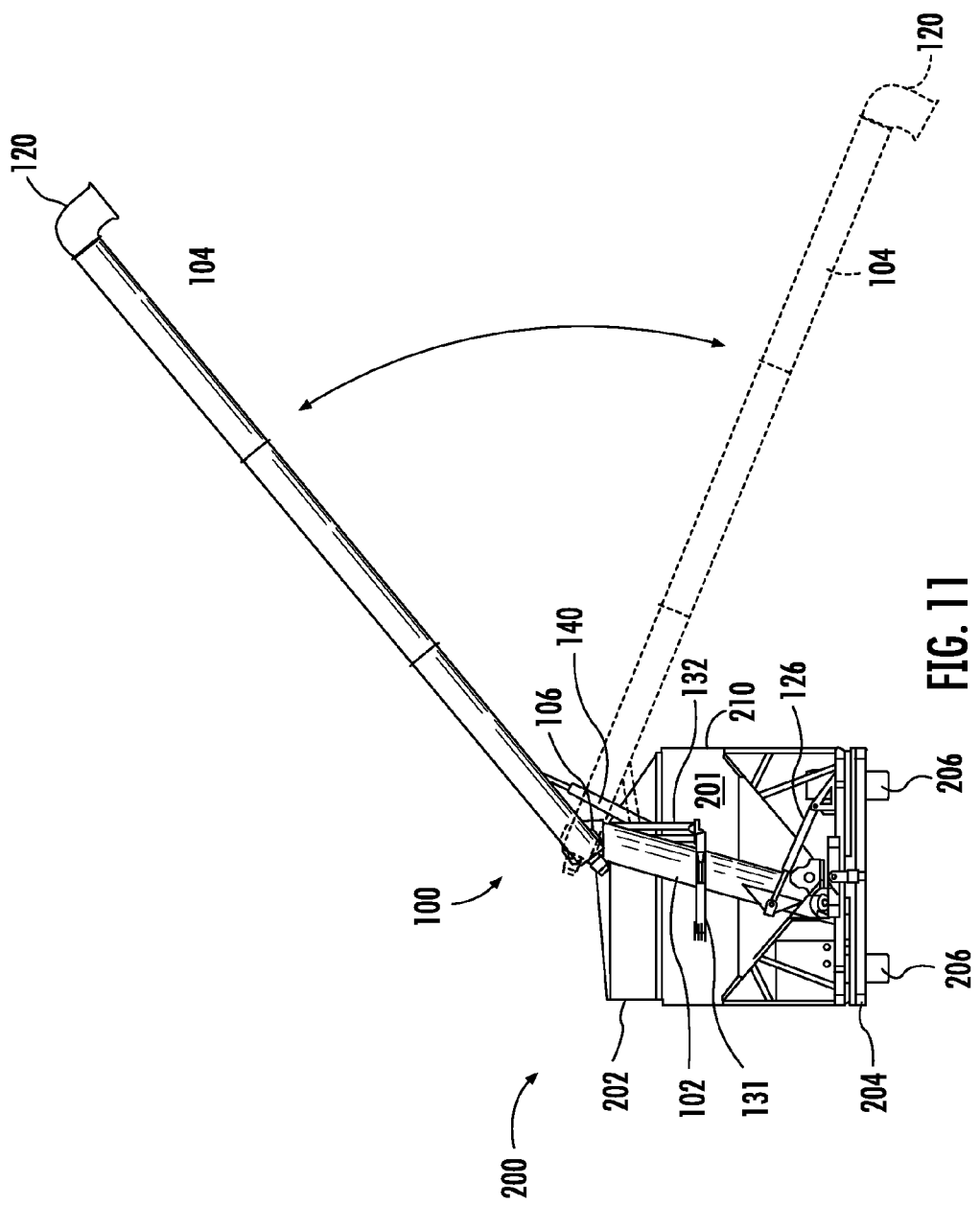
FIG. 11 is a front elevational view of the auger assembly and material handling apparatus of FIG. 1 displaying movement of the auger assembly in a third direction.

Referring to FIGS. 7, 10, and 11, the pivotal movements of the various components of the auger assembly 100 are shown. For ease of discussion, directional references in the following discussion of FIGS. 7, 10, and 11 will be from the perspective of viewing the front of the assembly 100 and apparatus 200, with the front wall 201 being the wall closest to the tractor pulling the material handling apparatus 200 to which the assembly is attached FIG. 7 shows the assembly 100 in a first position in solid lines and a second position in broken lines. This movement about axis 124 facilitates right-to-left (or in-and-out) movement of the auger assembly and particularly the auger assembly output 120 and up-and-down movement, as well as a combination of same. FIG. 10 shows the front-to-back movement of the second auger section 104, and particularly the auger output assembly 120 and represents the position of the assembly 100 as it rotates about axis 134. A first assembly 100 position is shown in solid lines, while a second assembly 100 position is shown in broken lines. FIG. 11 shows the up-and-down movement of the second auger section 104 and auger assembly output 120 as it pivots about axis 136. As the assembly 100 is able to move about three axes 124, 134, 136, the auger assembly 100, including the auger assembly output 120, is capable of three directional movement. Further, the assembly 100 is capable of rotating about two and three axes simultaneously, providing for seamless movement of the auger assembly output 120 from one point in space to the next.

A significant advantage of moving the assembly 100 from one location to the next is the ability to fill a transport apparatus 122 without moving the transport apparatus 122 or the apparatus 200 during the loading process. Rather, the operator may manipulate the location of the assembly 100, and particularly the auger assembly output 120, to evenly dispense product throughout the entire area of the transport apparatus 122. As one skilled in the art will recognize, transport apparatuses 122 may include, but are not limited to, semi-trucks and grain wagons. As discussed above, one embodiment of an apparatus 200 of the present invention is a surge bin 202. Although a surge bin 202 of the present invention may be used in any manner by any party to store material, it is anticipated that the surge bin 202 will most often be temporarily located in a field that is being harvested. Grain carts that receive product from a combine harvesting in the field unload into the surge bin 202 located in the field. The surge bin acts as a temporary storage location for the harvested material. Accordingly, the grain carts need not wait until a semi-truck or grain wagon is available to transport the product to a location off-site, such as an elevator or grain bin. Once a transport apparatus 122 is available, the surge bin unloads product into the apparatus 122. Moreover, as discussed above, traditionally the task of unloading product into a transport apparatus 122 has required two operators, one to operate the auger and another to move the transport apparatus 122. However, the assembly 100 of the present invention only requires one operator. Because the auger assembly output 120 is capable of three-dimensional movement, the transport apparatus 122 may remain stationary during the unloading process. Accordingly, the operator of the transport apparatus 122 may park the apparatus 122 and disembark to operate the assembly 100.

The movement of the assembly 100 during the process of unloading material, specifically grain 123, from a surge bin 202 of the present invention into the trailer 212 of a semi-truck is shown in FIGS. 12-14. In FIG. 12, the auger assembly output 120 is located above the front of the trailer. By manipulating the auger 100, which will be discussed in further detail below, the operator can move the auger assembly output 120 to any position within reach above the trailer 212. For example, in FIG. 13, the auger assembly output 120 is located above the center of the trailer 212. To accomplish this movement, the joint 106 must rotate about axis 134 to the right (when viewing FIGS. 12-14). Due to the circular rotational pattern, this movement alone may cause the auger assembly output 122 to move to a position which is no longer above the trailer to be filled. Accordingly, the first auger section 102 pivots about the axis 124 to move the auger assembly 100 in-and-out as required. In the illustrated example, the first auger section 102 pivots left about axis 124 to move the auger assembly 100 in. Further, in this particular example, the movement about axis 124 will have the consequence of raising the auger assembly output 120. Due to the circular path of the assembly, movement of the assembly 100 about axis 124 can both raise and lower the auger assembly output 120 depending on the starting and ending position of the assembly 100. To counteract the upward movement of the auger assembly output 120, the second auger section 104 pivots downwardly about axis 136. Through the three-directional movement of the auger assembly 100, it is possible to maintain output of material along a straight path from the front to rear of the trailer. This results in even filling of the trailer from the front to the back more efficiently than the circular path of prior art augers. Moreover, the three-directional movement of the auger assembly 100 of the present invention allows the user to fill the entire trailer without moving either the semi-truck or the material handling apparatus 200 to which the assembly 100 is attached.

A similar sequence of movement is used to move the auger assembly output 120 from its position in FIG. 13 to its position in FIG. 14. FIG. 14 illustrates the auger assembly output 120 above the rear of the trailer 212. To effect this movement, the joint 106 again rotates to the left about axis 134. The circular movement of the second auger section 106 will cause the auger assembly output 120 to move inwardly. In a simultaneous action, the first auger section 102 pivots to the right about axis 124 to counteract the inward motion. Because the movement of the assembly 100 about axis 124 alone would cause the auger assembly output 120 to drop, the second auger section 104 will pivot upward about axis 136 to maintain the auger assembly output at a height above the trailer and prevent the assembly 100 from coming into contact with the trailer 212. The simultaneous combination of these movements causes the auger assembly output 120 to dispense grain in the same horizontal plane as the assembly 100 moves from the position shown in FIG. 13 to the position shown in FIG. 14.

As referenced above and shown in FIGS. 1 and 3, in the preferred embodiment, the various movements of the assembly 100 are carried out by a hydraulic system. Preferably, the hydraulic system is powered by a single hydraulic control block located on the apparatus 200. In the preferred embodiment, the auger assembly 100 includes dual controls. The hydraulic control block includes valve banks with levers that control the auger assembly and a joystick is electronically attached to the auger assembly 100, which will be discussed in further detail below. The flighting of the three individual augers—the first auger section 102, the second auger section 104, and the material handling apparatus auger 214—are each powered by one of three dedicated motors. In other embodiments of the present invention, the power for any of the movements of the auger assembly 100 or other parts of the apparatus 200 may come from either the material handling apparatus 200 or the tractor pulling the apparatus 200.

Figure 15:
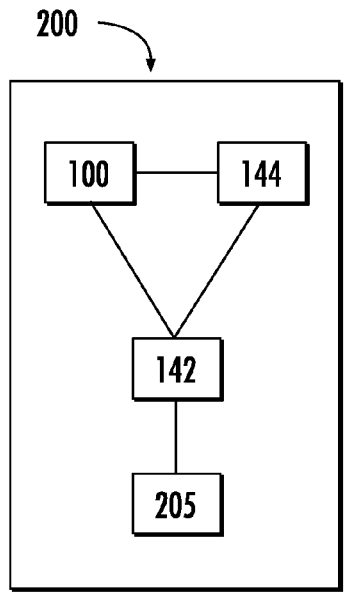
FIG. 15 is a schematic according to one embodiment of a joystick, auger assembly, and electronic controller of the present invention.

Referring to FIG. 15, the auger assembly 100 of the present invention may be controlled by an electronic or electric controller 142. The electronic controller 142 may be connected to the auger assembly 100 by any method known in the art now or in the future, including but not limited to, a wired connection and a wireless connection. In the preferred embodiment, the electronic controller 142 includes a screen and buttons for inputting information and running programs. In addition, the auger assembly 100 may be manually controlled by any method known in the art now or in the future. In the preferred embodiment, the auger assembly 100 is manually operated by a joystick 144. It is preferred that the electronic controller 142 regulates the rate of movement of the material through the auger assembly 100, while the joystick 144 controls the position of the auger 100. The joystick 144 and electronic controller 142 are also connected, such as via a hardwire, so that the controller 142 may send information to the joystick 144 regarding the automatic start and/or shut-down sequences, which will be discussed in further detail below.

The preferred electronic controller 142 is capable of receiving and storing information regarding the weight of material located in the apparatus 200 and the weight of material that the transport apparatus 122 may hold. Information regarding the weight of material located in the apparatus 200 may be manually entered in the electronic controller 142. Preferably, however, apparatus 200 includes at least one scale 205 to measure the weight of material in same, as shown in FIGS. 5 and 15. The scale 205 continually transmits information to the apparatus 200, such as by a hardwired or wireless connection. It should be appreciated that the scale 205 can be connected to the electronic controller 142 by any means known in the art, now or in the future. Information about the weight of material that the transport apparatus 122 may hold is generally manually inputted into the electronic controller 142. However, the information may be inputted or transmitted to the electronic controller 142 by any method known in the art, now or in the future.

By way of example, an apparatus 200 of the present invention may be located in a field that is being harvested. Grain carts that travel alongside combines will unload material into a surge bin 202 of the present invention. When available, a transport apparatus 122, such as a grain cart or semi-truck, will park beside the apparatus 200, within range of the auger assembly 100, to be filled with harvested material. An operator, such as the driver of the transport apparatus will use the joystick 144 to position the auger assembly 100 above the container of the transport apparatus 122. The operator will then use the electronic controller to the fill the transport apparatus 122. In some cases the operator will be required to enter information about the transport apparatus 122, such as an identification name and maximum weight. In other cases, such as if the transport apparatus 122 has been used with the electronic controller 142 previously, the information will already be stored in the controller 142, and the operator will simply need to select the transport apparatus 122 from the list stored in the controller 142.

Figure 16:
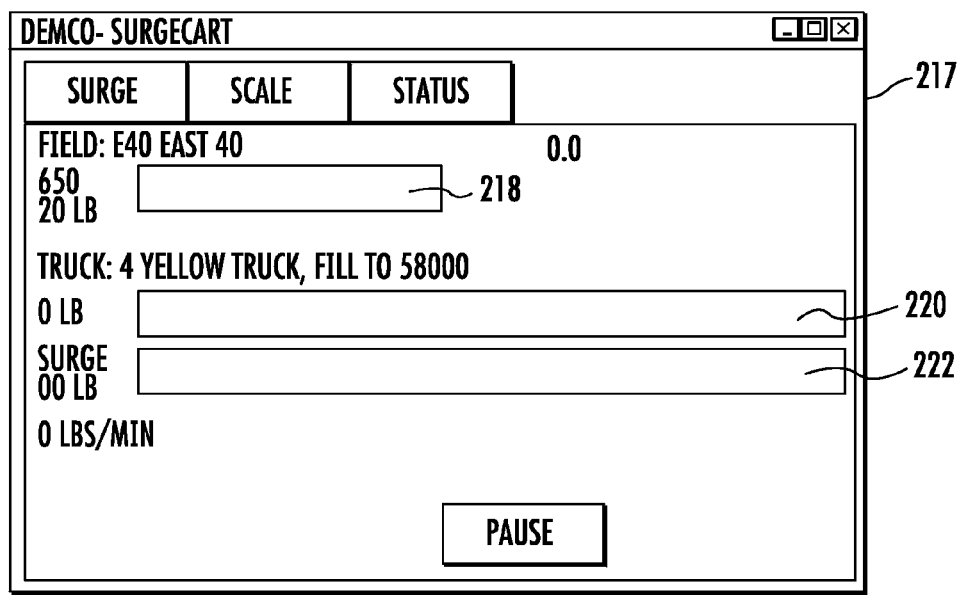
FIG. 16 is a screen of an electronic controller according to one embodiment of an electronic controller of the present invention.

Once the operator instructs the controller 142 to begin the unloading process, the controller 142 automatically controls same, while the operator uses the joystick 144 to control the movement of the auger assembly 100. FIG. 16 illustrates an embodiment of a controller program adapted to fill a transport apparatus 122 from material located in a surge bin 202, specifically a main information screen 217. The program includes information related to the capacity of a transport apparatus 122, designated as "Yellow Truck" in the figure, as well as a bar graph 220 showing the weight of material that has been transferred to the transport apparatus 122. The program further provides information regarding the weight of material in the surge bin 202, by way of another bar graph 222. The program receives signals from one or more scales located on the surge bin 202 of the present invention to measure the weight of same. The weight of material in the transport apparatus 122 is calculated by the program based on the flow rate of material to the apparatus 122. The illustrated program further includes a bar graph 218 and related information regarding the capacity of a grain cart and the actual weight of material in same. The electronic controller 142 controls the auger doors 216 to allow grain to drop down to the material handling apparatus auger 214. In the preferred embodiment, the speed of the flighting of all auger sections is constant and controlled by the electronic controller 142.

Once the transport apparatus 122 is nearly full, the electronic controller 142 will automatically initiate shut-down of the auger. In the preferred embodiment, when there is 1120 pounds of material left to be unloaded, the controller 142 initiates the shut-down sequence. This value may be changed by the user, but is automatically changed to correct scale readings as described in further detail below. Of course, the controller may be programmed to initiate shut-down when any amount of material remains to be moved to the transport apparatus 122. This shut-down signal is also transmitted to the joystick 144. Preferably the controller 142 and joystick 144 are hardwired to each other. However, the two components may be connected via any means known in the art, either now or in the future. In the preferred embodiment, the transport apparatus 122 will be filled within 65 pounds of its capacity during the automatic filling process; however, this value will fluctuate due to factors including but not limited to, the variety, moisture content, and type of grain. It should be appreciated that the transport apparatus 122 could be filled within any value of its capacity without departing from the scope of the present invention. The self-correcting feature of the assembly 100 and electronic controller 142, which will be discussed in further detail below, will keep this value as close to zero as possible. In addition to transport apparatuses 122 with a single container for filling, the electronic controller 142 may be programmed to fill transport apparatuses 122 with multiple containers, such as double tank trucks, including those wherein the tanks are different capacities.

The electronic controller 142 may optionally be programmed to self-correct by any percentage based on the accuracy of each load into a particular transport apparatus 122. For example, if a semi-trailer may hold 10,000 pounds of material and the user programs the electronic controller 142 to self-correct by 50%, the first time the apparatus 200 unloads into the trailer, it will be programmed to fill the trailer with an amount of material that is less than 10,000 pounds, for example 9000 pounds. If the capacity of the specific trailer is not changed following the first loading, the controller 142 will then correct itself by 50%. Accordingly, in the second filling of the particular trailer, the electronic controller will fill the transport apparatus 122 with 9500 pounds of material. If the capacity is not changed, the transport apparatus 122 will be filled with 9750 pounds of material during the third filling, and so on. As one of skill in the art will recognize, the controller 142 may be programmed to load the transport apparatus 122 to any percent full as the application may require. It should be appreciated that the self-correct feature may be used to both increase and decrease the amount of grain moved to a transport apparatus 122. This feature may be used to both prevent both over-filling and under-filling of a transport apparatus 122 and, accordingly, leads to increased accuracy during filling.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements, and/or substantial equivalents.

The invention claimed is:
1. An auger assembly for moving material comprising:
a first auger section receiving said material from an auger assembly intake, said first auger section pivotable with respect to said auger assembly intake about a first axis, said first auger section including a first diameter cylinder and said auger assembly intake including a second diameter cylinder, wherein said first and second diameter cylinders rotate with respect to each other;
a second auger section;
a joint connecting said first auger section and said second auger section and allowing the flow of said material from said first auger section to said second auger section;
said second auger section pivotable with respect to said joint about a second axis, said second auger section including a third diameter cylinder and said joint including a fourth diameter cylinder, wherein said third and fourth diameter cylinders rotate with respect to each other;
said joint rotatable about a third axis with respect to said first auger section, said joint including a fifth diameter cylinder and said first auger section including a sixth diameter cylinder, wherein said fifth and sixth diameter cylinders rotate with respect to each other; and said auger assembly capable of three-directional movement.

2. The auger assembly of claim 1 wherein said first diameter cylinder is larger in diameter than said second diameter cylinder and said first diameter cylinder surrounds said second diameter cylinder.

3. The auger assembly of claim 1 wherein said third diameter cylinder is larger in diameter than said fourth diameter cylinder and said third diameter cylinder surrounds said fourth diameter cylinder.

4. The auger assembly of claim 1 wherein said fifth diameter cylinder is larger in diameter than said sixth diameter cylinder and said fifth diameter cylinder surrounds said sixth diameter cylinder.

5. The auger assembly of claim 1 wherein said first diameter cylinder is larger in diameter than said second diameter cylinder and said first diameter cylinder surrounds said second diameter cylinder, said third diameter cylinder is larger in diameter than said fourth diameter cylinder and said third diameter cylinder surrounds said fourth diameter cylinder, and said fifth diameter cylinder is larger in diameter than said sixth diameter cylinder and said fifth diameter cylinder surrounds said sixth diameter cylinder.

6. The auger assembly of claim 5 wherein said first axis extends through the center of said first and second diameter cylinders.

7. The auger assembly of claim 6 wherein said second axis extends through the center of said third and fourth diameter cylinders.

8. The auger assembly of claim 7 wherein said third axis extends through the center of said fifth and sixth diameter cylinders.

9. The auger assembly of claim 1 further comprising an electronic controller adapted to control said auger assembly.

10. The auger assembly of claim 9 further comprising at least one auger door controlled by said electronic controller.

11. The auger assembly of claim 9 wherein said electronic controller is adapted to automatically start said auger to initiate an unloading process.

12. The auger assembly of claim 9 wherein said electronic controller is adapted to calculate the amount of material transferred by said auger assembly and to automatically stop said auger to end an unloading process based on the amount of material transferred by said auger assembly.

13. The auger assembly of claim 1 wherein the position of said auger assembly is manually controlled.

14. The auger assembly of claim 13 wherein the position of said auger assembly is manually controlled by a joystick.

15. The auger assembly of claim 1 wherein said auger assembly is capable of both automatic control by an electronic controller and manual control.

16. The auger assembly of claim 1 wherein said first and second auger sections are powered by first and second motors, respectively.

17. A material handling apparatus comprising:
a container for storing said material;
an auger assembly for moving material comprising:
  a first auger section receiving said material from said container via an auger assembly intake, said first auger section pivotable with respect to said auger assembly intake about a first axis, said first auger section including a first diameter cylinder and said auger assembly intake including a second diameter cylinder, wherein said first and second diameter cylinders rotate with respect to each other;
  a second auger section;
  a joint connecting said first auger section and said second auger section and allowing the flow of said material from said first auger section to said second auger section;
  said second auger section pivotable with respect to said joint about a second axis, said second auger section including a third diameter cylinder and said joint including a fourth diameter cylinder, wherein said third and fourth diameter cylinders rotate with respect to each other;
  said joint rotatable about a third axis with respect to said first auger section, said joint including a fifth diameter cylinder and said first auger section including a sixth diameter cylinder, wherein said fifth and sixth diameter cylinders rotate with respect to each other; and
  said auger assembly capable of three-directional movement.

18. The material handling apparatus of claim 17 wherein said auger further comprises at least one manual positioning device.

19. The material handling apparatus of claim 17 further comprising an auger door.

20. The material handling apparatus of claim 19 further comprising an electric controller adapted to control at least one of said auger door and auger assembly.

21. The material handling apparatus of claim 20 wherein said controller automatically initiates unloading of said material from said material handling apparatus.

22. The material handling apparatus of claim 20 wherein said controller is adapted to calculate the amount of material transferred by said auger assembly and to automatically end unloading of said material from said material handling apparatus based on the amount of material transferred by said auger assembly.

23. An auger assembly for moving material comprising:
a first auger section configured to move said material from an auger assembly intake to a second auger section, said first auger section pivotable with respect to said auger assembly intake about a first axis, said first auger section including a first diameter cylinder and said auger assembly intake including a second diameter cylinder, wherein said first and second diameter cylinders rotate with respect to each other;
said second auger section configured to move said material from said first auger section to an auger assembly output;
a joint connecting said first auger section and said second auger section and allowing the flow of said material from said first auger section to said second auger section;
said second auger section pivotable with respect to said joint about a second axis, said second auger section including a third diameter cylinder and said joint including a fourth diameter cylinder, wherein said third and fourth diameter cylinders rotate with respect to each other;
said joint rotatable about a third axis with respect to said first auger section, said joint including a fifth diameter cylinder and said first auger section including a sixth diameter cylinder, wherein said fifth and sixth diameter cylinders rotate with respect to each other;
said auger assembly capable of three dimensional movement;
an electric controller adapted to calculate the amount of material flowing through said auger assembly and to control the flow of said material through said auger assembly and into a transport apparatus based on said calculations; and a manual control device adapted to position said auger assembly output;

wherein said auger assembly is capable of both electric and manual manipulation.

24. The auger assembly of claim 23 wherein said first diameter cylinder is larger in diameter than said second diameter cylinder and said first diameter cylinder surrounds said second diameter cylinder, said third diameter cylinder is larger in diameter than said fourth diameter cylinder and said third diameter cylinder surrounds said fourth diameter cylinder, and said fifth diameter cylinder is larger in diameter than said sixth diameter cylinder and said fifth diameter cylinder surrounds said sixth diameter cylinder.

* * * * *